United States Patent
Someya et al.

(10) Patent No.: US 7,378,075 B2
(45) Date of Patent: May 27, 2008

(54) ALIGNED CARBON NANOTUBE FILMS AND A PROCESS FOR PRODUCING THEM

(75) Inventors: Masao Someya, Ibaraki (JP); Takashi Fujii, Ibaraki (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 486 days.

(21) Appl. No.: 10/393,364

(22) Filed: Mar. 21, 2003

(65) Prior Publication Data

US 2003/0211029 A1 Nov. 13, 2003

(30) Foreign Application Priority Data

Mar. 25, 2002 (JP) .............................. 2002-083044

(51) Int. Cl.
*D01F 9/12* (2006.01)
(52) U.S. Cl. .................................. 423/447.3; 977/843
(58) Field of Classification Search ............. 423/447.1, 423/447.3; 977/843
See application file for complete search history.

(56) References Cited

U.S. PATENT DOCUMENTS

| | | | |
|---|---|---|---|
| 4,663,230 A | 5/1987 | Tennent | |
| 5,747,161 A | 5/1998 | Iijima | |
| 6,129,901 A | 10/2000 | Moskovits et al. | |
| 6,232,706 B1 | 5/2001 | Dai et al. | |
| 6,277,318 B1 | 8/2001 | Bower et al. | |
| 6,278,231 B1 | 8/2001 | Iwasaki et al. | |
| 6,303,094 B1 | 10/2001 | Kusunoki et al. | |
| 6,350,488 B1 | 2/2002 | Lee et al. | |
| 6,545,396 B1 | 4/2003 | Ohki et al. | |
| 6,700,550 B2* | 3/2004 | Crowley | 343/792.5 |

FOREIGN PATENT DOCUMENTS

| | | |
|---|---|---|
| JP | 2001-62299 | 3/2001 |
| JP | 2001-130904 | 5/2001 |
| JP | 2001-220674 | 8/2001 |
| JP | 2002-338221 | 11/2002 |
| WO | WO 98/42620 | 10/1998 |
| WO | WO 99/43613 | 9/1999 |

OTHER PUBLICATIONS

Joo et al.,'Ordered Nanoporous Arrays of Carbon Supporting High Dispersions of Platinum Nanoparticles' in *Letters to Nature* Jul. 12, 2001. (*Nature* vol. 412 pp. 169-172).*
Li et al., 'Large-Scale Synthesis of Aligned Carbon Nanotubes' in Science vol. 274 pp. 1701-1703, Dec. 6, 1996.*
U.S. Appl. No. 10/061,218, filed Feb. 4, 2002, Someya et al.
"Growth of Well-Aligned Carbon Nanotubes on a Large Area of Co-Ni Co-deposited Silicon Oxide Substrate by Thermal Chemical Vapor Deposition", Lee et al., Chemical Physics Letters 323 (2000) 554-559.
"Highly Ordered Carbon Nanotube Arrays for Electronics Applications", Li et al., Aplied Physics Letters, vol. 75, No. 3, Jul. 19, 1999, pp. 367-369.
"Very Long Carbon Nanotubes", Pan et al., Nature, vol. 394, Aug. 13, 1998, pp. 631-632.
"Helical Microtubules of Graphitic Carbon", Iijima, Nature, vol. 354, Nov. 7, 1991, pp. 56-58.

* cited by examiner

*Primary Examiner*—Stuart Hendrickson
(74) *Attorney, Agent, or Firm*—Roylance, Abrams, Berdo & Goodman, L.L.P.

(57) ABSTRACT

Fine catalyst particles are loaded on a sol-gel method porous carrier having fine pores of 0.1-50 nm and a carbon compound is decomposed to form a carbon nanotube film on the carrier that is aligned perpendicular to the carrier surface. The starting sol to be processed by a sol-gel method is a dispersion of fine alumina particles, fine aluminum hydroxide particles, fine silica particles or mixtures thereof. Alternatively, the starting sol may be an aluminum alkoxide, an alkoxysilane, a mixture thereof or a solution of an aluminum alkoxide, an alkoxysilane or a mixture thereof. If desired, a flammable or a thermally decomposable organic compound may be added as a microporous template.

21 Claims, 4 Drawing Sheets

ALIGNED CARBON NANOTUBE FILMS AND A PROCESS FOR PRODUCING THEM

BACKGROUND OF THE INVENTION

This invention relates a process for producing an aligned carbon nanotube film comprising a large number of aligned carbon nanotubes. The process is advantageous for producing aligned carbon nanotube films that find use as electron emitters, battery electrodes, gas separation films, sensors and in energy storage.

The carbon nanotube was first discovered by Sumio Iijima in 1991 (Nature, 354, pp. 56-58 (1991)). It is a carbon material, generally in the form of a very long (1-100 μm) hollow tube with a diameter of 1-100 nm. A wide range of potential applications have been proposed for the carbon nanotube and they include the use as electron emitters, battery electrodes, gas separation membranes, sensors and in energy storage. When a multiple of carbon nanotubes are to be used in these applications, the tubes are preferably aligned in one direction so that their individual features are integrated and assembled into a system in an efficient and easy manner. It has been demonstrated that in terms of electron emission characteristics and physical properties such as strength, nanotubes with smaller outside diameters are advantageous.

Commonly employed methods of producing carbon nanotubes include arc discharge with graphite electrodes, laser sublimation of graphite, and vapor-phase decomposition of carbon compounds using suspended catalytic metal particles. However, the many carbon nanotubes produced by these methods lack alignation and are unsuitable for shaping into a bundle or film.

Aligned carbon nanotube films or bundles of aligned carbon nanotubes can be formed by one of two methods, aligning separately produced carbon nanotubes on a substrate (Japanese Laid-Open Publication No. 2001-130904) and producing carbon nanotubes directly on a substrate. The latter method provides ease in achieving orientation in one direction and is a more advantageous method. Techniques for producing carbon nanotubes on a substrate include: (1) forming a catalytic metal membrane on a substrate, etching the membrane and thermally decomposing hydrocarbon on the substrate (U.S. Pat. No. 6,350,488); (2) preparing an iron-containing mesoporous silica substrate by a sol-gel method, reducing it with hydrogen and thermally decomposing acetylene on the substrate (Nature, 394, pp. 631-632 (1998)); (3) irradiating a substrate with plasma or microwaves to form carbon nanotubes (WO 99/043613); (4) forming a thin film of silicon carbide single crystal on a silicon substrate by epitaxial growth, separating it from the substrate by etching and heating it at high temperature in an oxygen-containing atmosphere (WO 98/042620); (5) anodizing an aluminum plate, electrodepositing cobalt on the bottom of the oxide film to prepare a substrate, reducing the substrate with carbon monoxide and thermally decomposing acetylene (U.S. Pat. No. 6,129,901); (6) forming a catalytic metal layer on a surface of a substrate by vacuum vapor deposition and thermally decomposing hydrocarbon (Japanese Laid-Open Publication No. 2001-220674); (7) preparing fine catalyst particles by a reverse micelle method or the like, loading them on a substrate and thermally decomposing hydrocarbon (Japanese Patent Laid-Open No. 2001-62299).

However, these methods involve cumbersome steps for preparing the substrate on which to form aligned carbon nanotubes and it is in only limited areas that they can form aligned carbon nanotubes. Hence, it has been difficult to realize economical production of large-area aligned carbon nanotube films that are suitable for use in the above-mentioned applications. In addition, in all approaches except method (4), the carbon nanotubes in aligned films have outside diameters greater than 20 nm.

Under the circumstances, the present inventors conducted intensive studies in order to develop a simple method of preparing an aligned film from carbon nanotubes having outside diameters of 20 nm and less and found that when a carbon compound was decomposed on a substrate that was coated with an element having no catalytic activity by itself and which loaded a metallic element having catalytic activity or a compound thereof, a carbon nanotube film was formed on the substrate surface as it was aligned in a direction perpendicular to the substrate (Japanese Patent Application No. 2001-120357).

SUMMARY OF THE INVENTION

An object, therefore, of the invention is to provide an aligned film comprising carbon nanotubes of reasonably smaller outside diameter.

This object can be attained by a process comprising the steps of preparing a sol-gel method porous carrier having fine pores of 0.1-50 nm and decomposing a carbon compound with a catalyst loaded on the carrier so as to form a carbon nanotube film that is aligned perpendicular to the porous carrier. The starting sol to be processed by a sol-gel method is a dispersion of fine alumina particles, fine aluminum hydroxide particles, fine silica particles or mixtures thereof. Alternatively, the starting sol may be an aluminum alkoxide, an alkoxysilane, a mixture thereof or a solution of an aluminum alkoxide, an alkoxysilane or a mixture thereof. If desired, a flammable or a thermally decomposable organic compound may be added as a microporous template.

An aligned film comprising carbon nanotubes having an outside diameter of 10 nm or less has good electron emission characteristics and exhibits desired physical properties such as high rigidity.

DETAILED DESCRIPTION OF THE INVENTION

The process of the invention for producing an aligned carbon nanotube film comprises the steps of preparing a sol-gel method porous carrier having fine pores of 0.1-50 nm and decomposing a carbon compound with a catalyst loaded on the carrier so as to form a carbon nanotube film that is aligned perpendicular to the porous carrier.

In the invention, a porous carrier having a lot of micropores no larger than 50 nm is used as a catalyst carrier. Being used to load the catalyst within fine pores, the porous carrier preferably has small pore diameters if fine carbon nanotubes are to be produced. Various methods are known to be applicable to the production of the porous carrier and they include, for example, a sol-gel method, a foaming method, elution, anodization and the use of natural substances. Among these, the sol-gel method has many advantages such as the ability to form a large-area carrier of reasonably satisfactory performance, moldability into a desired shape, formability on a load surface of a desired geometry, the ability to control the distribution of fine pores, ease of handling, and low cost.

If a porous film is to be formed on a support, the support may be made of any heat-resistant material selected from metals, metal oxides, ceramics, glass, silicon, silicon oxide, etc. Among these, porous ceramics are preferably used since they have particularly high heat resistance, can be easily formed into desired shapes by the sol-gel method, and permit easy application of the starting sol for the production of the porous carrier.

Since carbon nanotubes are produced by pyrolysis of carbon compounds, the carrier needs to have a certain degree of heat resistance. Porous materials satisfying this requirement include ceramics, zeolites, glass, silicon, noble metals, etc. Among these, ceramics are preferably used because of the ease in production and in pore size control.

The outside diameter of carbon nanotubes depends on the type of catalyst, the size of catalyst particles and the reaction conditions employed. Particularly predominant is the size of catalyst particles. If the type of catalyst and the reaction conditions are the same, the outside diameter of carbon nanotubes is determined by the size of catalyst particles. Generally speaking, it is preferred that the catalyst for use in the production of carbon nanotubes comprises small particles, not larger than 50 nm. Smaller catalyst particles are preferred for producing finer carbon nanotubes and in order to produce carbon nanotubes of uniform outside diameter, catalyst particles of uniform size are preferably used. Hence, in order to load the catalyst particles for the production of carbon nanotubes, it is preferred to use a carrier having fine pores of 0.1-50 nm in size. Depending on the use, it is preferred to further reduce the pore size or narrow down its distribution.

While various sol-gel method porous carriers can be used in the invention, alumina, silica and silica-alumina may be mentioned as examples that permit control in structure. The sol-gel method alumina, silica and silica-alumina can be produced by methods commonly employed to produce porous bodies. To be more specific, an aluminum hydroxide sol and a silica sol are mixed in desired proportions and burned in the air either directly or after being applied to a suitable substrate. In order to control the distribution of fine pores in the porous body by this method, the starting sol and the process parameters require strict control.

The starting sol may be prepared from fine alumina, aluminum hydroxide or silica particles not larger than 100 nm. These fine particles may be stand on their own or may be connected like a string of beads.

The starting sol may consist of silica alone, alumina alone or a mixture of silica and alumina. The silica-to-alumina ratio of the carrier film can be chosen at a desired value by adjusting the proportions at which silica and alumina are mixed. Generally speaking, the silica-to-alumina ratio of the carrier governs the efficiency at which it loads the catalyst. In other words, the affinity of the catalyst for the carrier which is to be dipped in the catalyst may be high or low depending on the silica-to-alumina ratio of the carrier. By choosing a suitable carrier/catalyst combination, carbon nanotubes of higher purity can be produced.

If the carrier is to be produced from a single kind of the starting sol, the distribution of fine pores in the resulting porous body is determined by the size of the component particles. Larger particles will produce larger pores and vice versa. If two or more starting sols are employed, the size of pores greatly varies with the combination of the sols and their mixing proportions. If the combination is appropriate, one can produce a porous body having smaller pores over a narrower size distribution than can be produced from a single starting sol. If the combination is not appropriate, various problems occur such as a broader distribution of pore size and the failure to produce a uniform sol on account of gelling of the sols as soon as they are mixed.

The temperature at which the sol is burned also depends on the distribution of fine pores. In the case of alumina, burning at low temperature yields a preferred alumina that is low in crystallinity and has a large number of very fine pores. If the burning temperature is high, the smaller pores disappear as crystallinity improves. In the present invention, the sol burning temperature is generally in the range of 300-900° C., preferably 500-900° C., more preferably 600-800° C.

In order to produce a carrier having much smaller pores, an aluminum alkoxide, an alkoxysilane or a mixture thereof or a solution of an aluminum alkoxide, an alkoxysilane or a mixture thereof may be employed, with a flammable or thermally decomposable organic compound being used as a microporous template.

Examples of the aluminum alkoxide include aluminum trimethoxide, aluminum triethoxide, aluminum tri-n-propoxide, aluminum tri-i-propoxide, aluminum tri-n-butoxide, aluminum tri-sec-butoxide and aluminum tri-tert-butoxide. Examples of the alkoxysilane include tetramethoxysilane, tetraethoxysilane, tetra-n-propoxysilane and tetra-n-butoxysilane. These compounds may be used either individually, in mixture or in solution. Note that some of these compounds are in powder form and must be rendered in solution if they are used at all. Also note that certain combinations of the compounds will gel.

The aluminum alkoxides and alkoxysilanes may also be used either individually or in mixture. Again, the silica-alumina ratio of the carrier film can be chosen at any desired value by adjusting the mixing proportions of the aluminum alkoxides and alkoxysilanes.

If the aluminum alkoxides and alkoxysilanes are used in solution, a variety of organic solvents may be employed. Examples are alcohols, ketones, esters, aromatics, hydrocarbons and any other organic solvents that can produce a uniform solution.

To the prepared uniform sol solution, a flammable or thermally decomposable organic compound is added as a microporous template. Since the shape of the organic compound affects the shape of the pores to be eventually formed in the carrier, organic compounds should be used having pore sizes that fit a specific purpose. The organic compound should preferably vanish in the subsequent sol burning step, so it is desirably flammable or thermally decomposable. Quaternary ammonium salts are advantageously used as organic compounds that satisfy this requirement. Exemplary quaternary ammonium salts include tetramethylammonium salts, tetraethylammonium salts, tetra-n-propylammonium salts, tetra-i-propylammonium salts and tetra-n-butylammonium salts. Anionic species to form salts include hydroxides, fluorides, chlorides, bromidess and iodides. Suitable quaternary ammonium salts can be chosen in accordance with the desired pore size.

By adjusting the addition of the flammable or thermally decomposable organic compound which is to be used as a microporous template, the density of micropores can be controlled and, hence, the density of fine catalyst particles can be chosen at any desired values, making it possible to control the density of carbon nanotubes in an aligned film.

After adding an acid catalyst and water, the sol is applied to a base and burned. The burning temperature is generally in the range of 300-900° C., preferably 350-700° C., more preferably 400-600° C.

By appropriate choice of the starting sol and the burning conditions, a porous carrier having a desired pore size distribution can be produced. Using a carrier having a controlled pore size distribution, one can produce an aligned film comprising carbon nanotubes having a corresponding desired outside diameter and density.

Any catalyst that can form carbon nanotubes may be employed in the invention and examples are Fe, Co, Mo, Ni and compounds thereof. These catalysts may be used either independently or in mixture.

The anionic species in the metal compounds to be used in the invention may be of any type as long as the metal compounds can dissolve in solvents. Exemplary salts include nitrates, sulfates, carbonates, acetates, naphthenates, chlorides, fluorides, bromides and iodides. Also applicable are metal complexes such as octacarbonyl and phthalocyanine. Among these, nitrates, acetates, carbonates and naphthenates are particularly preferred. Upon subsequent burning in the air, all of the compounds mentioned above turn into metal oxides with no other ions and compounds left behind. The compounds may be used either individually or in mixture of two or more compounds.

In the present invention, the catalyst can be loaded by any of the methods commonly employed to load catalysts within fine pores in porous carriers and two representative examples are impregnation and dipping. Either of these methods may be employed to form fine catalytic particles with the fine pores in the carrier being used as templates.

The size of the catalyst particles loaded is preferably in the range of 0.1-50 nm, more preferably 0.1-20 nm, and most preferably 0.1-10 nm. The smaller the catalyst particles, the smaller the carbon nanotubes that can be formed. The proportion of larger catalyst particles is preferably reduced since they generate thicker carbon nanotubes and amorphous carbon.

The catalyst loading on substrate thus prepared is then burned in the air, whereupon the metal compound, either partly or entirely, is dehydrated or oxidized to become a metal oxide. The burning temperature is between 50 and 700° C., preferably between 300 and 600° C. However, acetates and other compounds that undergo pyrolysis without oxygen to become oxides need not be burned at high temperature since they turn into oxides as the result of temperature elevation in the subsequent reaction step.

A more preferred method of loading the catalyst is by adding a base to an aqueous solution of a metal salt to render it neutral and drying and burning it within the pores in the porous carrier. Rendering the aqueous solution of a metal salt either neutral or weakly basic will help a metal hydroxide to be precipitated in the process of concentrating the solution. Therefore, by concentrating the solution within the pores in the carrier, a metal hydroxide is generated that is smaller than the size of the pores in the carrier. The thus formed metal hydroxide is burned to become fine particles. Generally speaking, metal hydroxides shrink upon burning and may be crushed into smaller particles.

The metallic elements in the metal salts to be used in the invention are preferably those which show catalytic activity for producing carbon nanotubes and which generate water-insoluble metal hydroxides. Exemplary elements that have such properties include the metallic elements of groups 6A, 7A and 8A of the periodic table. As catalysts having particularly high activity for producing carbon nanotubes, Co, Fe, Mo, Ni, etc. are generally known and also preferred in the present invention.

The anionic species in the metal salts to be used in the invention may be of any type as long as the metal salts are water-soluble. Exemplary salts include nitrates, sulfates, carbonates, acetates, naphthenates, chlorides, fluorides, bromides and iodides. Also applicable are water-soluble metal complexes such as octacarbonyl and phthalocyanine. Among these, nitrates, acetates, carbonates and naphthenates are particularly preferred. Upon subsequent burning in the air, all of the salts mentioned above turn into metal oxides with no other ions and compounds left behind. The salts may be used either individually or in mixture of two or more salts.

The base to be added to the aqueous solution of a metal salt may be of any type that renders the solution basic. Exemplary bases that may be used in the invention include sodium hydroxide, sodium carbonate, sodium hydrogencarbonate, sodium phosphate, potassium hydroxide, potassium carbonate, potassium hydrogencarbonate, ammonia and water-soluble amines. These bases can be used either on their own or as aqueous solution. Among these, ammonia or water-soluble amines are used with advantage. These can be readily removed by burning in the air or other operations in a subsequent step, with no salts such as alkali metals left behind. For ease of handling, aqueous ammonia is used with particular advantage.

The amount of the base to be added varies with the metal species and its concentration but as a general guide, it may be added in a sufficient amount to cause very slight precipitation of the metal hydroxide. The corresponding concentration of hydrogen ions is a pH of 6.0-8.0 when the metal species is cobalt(II) and a pH of 1.0-2.0 in the case of iron(III). Strictly speaking, it is recommended to add the base in an amount near the saturated concentration calculated from the solubility product of the metal hydroxide. If the addition of the base is excessive, metal hydroxides of large particle size will precipitate but no great harm is done since they are not loaded in the pores in the carrier. In addition, metal hydroxides of large particle size can be readily removed by a suitable operation such as filtration, decantation or centrifugation. However, if an unduly large excess of the base is added, all metal ions will precipitate, leaving no metal species that should be loaded in the pores in the carrier.

In the thus prepared catalyst fluid, a porous carrier or a porous carrier membrane forming substrate that have suitable pore sizes is dipped. The dipping time should be long enough for the catalyst fluid to get fully into the pores in the carrier and a period of at least 3 minutes is preferred. The catalyst loading on substrate dipped in the above-described aqueous solution of a metal salt is dried in the air. As the catalyst fluid in the pores dries, a metal hydroxide smaller than the pore sizes is precipitated within the pores.

Subsequently, the catalyst loading on substrate is burned in the air, whereupon the metal hydroxide, either partly or entirely, is dehydrated or oxidized to become a metal oxide. The burning temperature is between 200 and 700° C., preferably between 300 and 600° C.

An optimum value of the burning time varies with the burning temperature and a period of at least 1 hour is preferred. The burning step completes the preparation of a substrate for use in the production of an aligned carbon nanotube film.

When a carbon compound is decomposed on the thus prepared catalyst loading on substrate, a film of aligned carbon nanotubes is formed. Any carbon compounds may be used as long as they can generate carbon nanotubes in the presence of a suitable catalyst. Examples include saturated hydrocarbon compounds such as methane, ethane and propane, unsaturated hydrocarbon compounds such as ethylene, propylene and acetylene, aromatic hydrocarbon compounds such as benzene and toluene, and oxygen-containing hydrocarbon compounds such as methanol, ethanol and acetone. Preferred carbon compounds are methane, ethylene, propylene, acetylene, methanol, ethanol and propanol. The carbon compounds may be introduced in gaseous form either independently or in mixture with an inert gas such as argon or as saturated vapor in an inert gas. If the carbon compounds are mixed with compounds containing hetero atoms such as boron and nitrogen, one can produce nanotubes incorporating hetero atoms. Thermal decomposition (pyrolysis) is the most common reaction to be employed to decompose the carbon compounds. A preferred reaction temperature is between 400 and 1100° C., with the range of 500-900° C. being more preferred. A preferred reaction pressure is between 1 kPa and 1 Mpa, with the range of 0.01-0.12 mPa being more preferred.

In the embodiment under consideration, the catalyst particles are often concentrated at the tips of the individual aligned carbon nanotubes, namely, in the outer surface of the film comprising the aligned carbon nanotubes.

According to the process of the invention, a film comprising aligned carbon nanotubes that are 1-100 μm high and cover an area of at least 50 cm$^2$ can be formed uniformly on a substrate. The individual carbon nanotubes have an outside diameter of 1-50 nm.

An aligned film comprising carbon nanotubes having an outside diameter of no more than 10 nm exhibits high performance in electron emission characteristics, rigidity and other properties. An aligned film comprising carbon nanotubes longer than 10 μm can be handled with ease.

Figure 1:
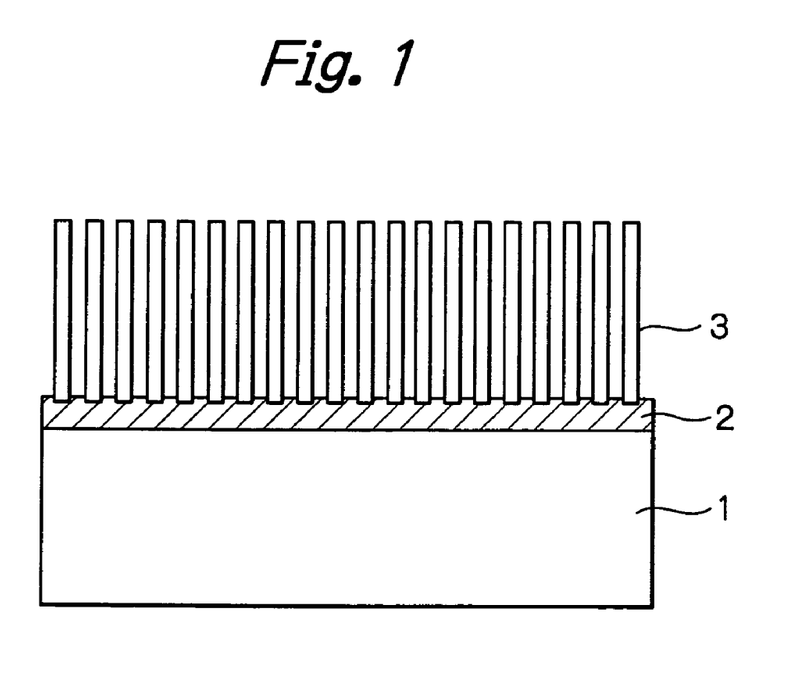
FIG. 1 is a schematic representation of a carbon nanotube aligned film;
1 support
2 porous carrier
3 aligned carbon nanotube film

In FIG. 1, support is shown at 1; porous carrier is shown at 2 and aligned carbon nanotube film is shown at 3.

The following examples are provided for further illustrating the present invention but are in no way to be taken as limiting.

EXAMPLE 1

A square silica-alumina sheet that consisted of 25% silica and 75% alumina and which measured 2 mm thick and 30 mm on each side was chosen as a substrate. This substrate was dipped in Alumina Sol 200 of Nissan Chemical Industries, Ltd. as diluted 4-fold with ion-exchanged water. After 10 minutes' dipping, the substrate was recovered from the solution, dried in the air and burned at 700° C. for 5 hours. Measurement by the BET method showed that the alumina burned by the above procedure had an average pore size of 8.8 nm.

A catalyst fluid was prepared by adding 10 μL of 30% aqueous ammonia to 90 g of an aqueous solution of cobalt nitrate at a concentration of 0.2 mol/L. By addition of aqueous ammonia, the concentration of hydrogen ions in the solution changed from a pH of 4.5 to 7.2

The previously prepared alumina substrate was dipped in the catalyst fluid for 10 minutes. The substrate was recovered, air dried for 1 hour and burned at 400° C. for 3 hours in the air. After cooling, the substrate was placed in a quartz glass tubular oven having a diameter of 35 mm. With argon being supplied at a rate of 360 cm$^3$/min in a horizontal direction under atmospheric pressure (0.1 MPa), the temperature in the tubular oven was raised to 700° C. Then, with the temperature held at 700° C., argon (360 cm$^3$/min) was mixed with propylene (120 cm$^3$/min) and supplied into the tubular oven. After the mixture of propylene and argon gases was flowed for 30 minutes, the supply was changed to pure argon and the heating in the tubular oven was stopped, with the substrate being left to cool to room temperature.

Figure 2:
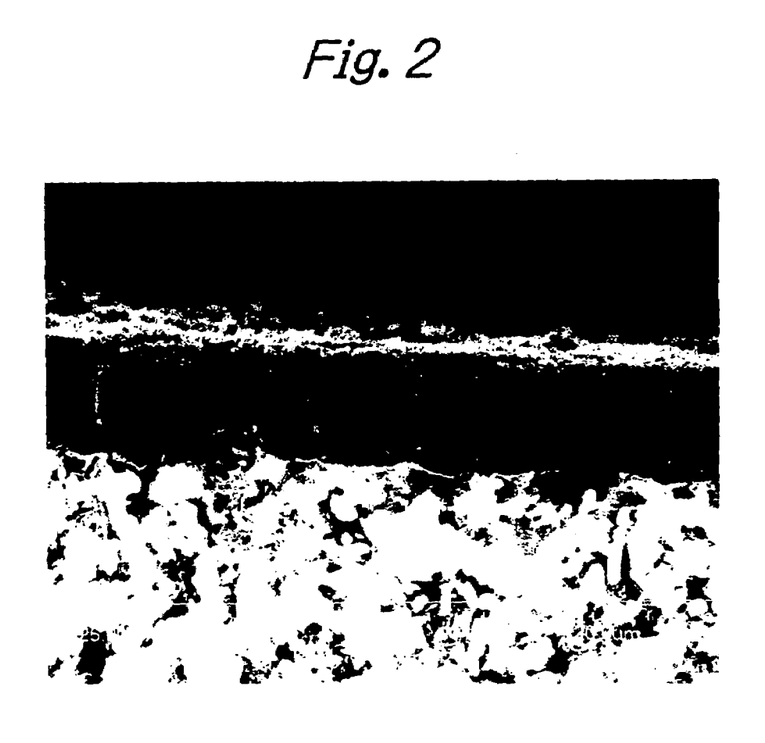
FIG. 2 is a SEM image of a carbon nanotube aligned film on a substrate.
Figure 3:
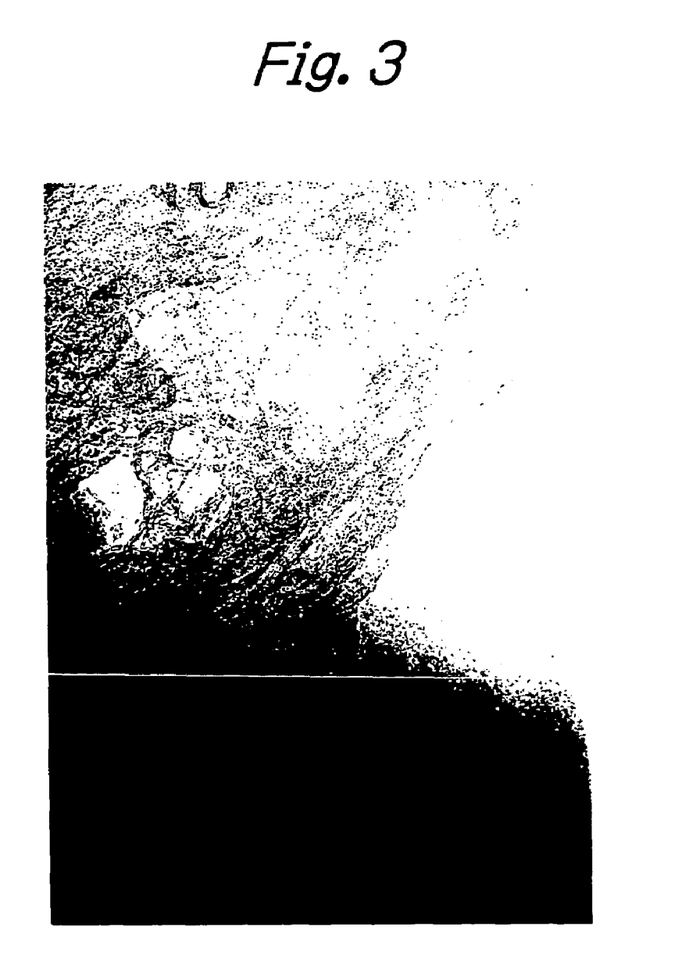
FIG. 3 is a TEM image of carbon nanotubes.

After the end of the reaction, the surface of the substrate was examined with a scanning electron microscope (SEM) and it was confirmed that an aligned carbon nanotube film had been formed in a thickness of about 10 μm on top of the substrate. FIG. 2 is a SEM image showing a cross section of the substrate. Examination with a transmission electron microscope (TEM) showed that the carbon nanotubes in the aligned film stacked in 2-7 layers with outside diameters of 5-10 nm. See FIG. 3 for the TEM image of the carbon nanotubes in the aligned film. The tip of the aligned film was also examined with a TEM, revealing that it enclosed ultra-fine (5-7 nm) metal particles.

EXAMPLE 2

A square silica-alumina sheet that consisted of 25% silica and 75% alumina and which measured 2 mm thick and 30 mm on each side was chosen as a substrate. This substrate was dipped in Alumina Sol 200 of Nissan Chemical Industries, Ltd. as diluted 4-fold with ion-exchanged water. After 10 minutes' dipping, the substrate was recovered from the solution, dried in the air and burned at 650° C. for 5 hours. Measurement by the BET method showed that the alumina burned by the above procedure had an average pore size of 6.7 nm.

A catalyst fluid was prepared by adding 10 μL of 30% aqueous ammonia to 90 g of an aqueous solution of cobalt nitrate at a concentration of 0.2 mol/L. By addition of aqueous ammonia, the concentration of hydrogen ions in the solution changed from a pH of 4.5 to 7.2

The previously prepared alumina substrate was dipped in the catalyst fluid for 10 minutes. The substrate was recovered, air dried for 1 hour and burned at 400° C. for 3 hours in the air. After cooling, the substrate was placed in a quartz glass tubular oven having a diameter of 35 mm. With argon being supplied at a rate of 360 cm$^3$/min in a horizontal direction under atmospheric pressure (0.1 MPa), the temperature in the tubular oven was raised to 700° C. Then, with the temperature held at 650° C., argon (360 cm$^3$/min) was mixed with propylene (120 cm$^3$/min) and supplied into the tubular oven. After the mixture of propylene and argon gases was flowed for 30 minutes, the supply was changed to pure argon and the heating in the tubular oven was stopped, with the substrate being left to cool to room temperature.

After the end of the reaction, the surface of the substrate was examined with a SEM and it was confirmed that an aligned carbon nanotube film had been formed in a thickness of about 20 μm on top of the substrate. The individual carbon nanotubes had outside diameters of 4-9 nm.

EXAMPLE 3

A square silica-alumina sheet that consisted of 25% silica and 75% alumina and which measured 2 mm thick and 30 mm on each side was chosen as a substrate. This substrate was dipped in Alumina Sol 200 of Nissan Chemical Industries, Ltd. as diluted 4-fold with ion-exchanged water. After 10 minutes' dipping, the substrate was recovered from the solution, dried in the air and burned at 800° C. for 5 hours.

Measurement by the BET method showed that the alumina burned by the above procedure had an average pore size of 10.4 nm.

Except for the use of this substrate, preparation of a catalyst fluid, dipping of the substrate in the catalyst fluid and a reaction for producing a carbon nanotube aligned film were performed as in Example 1. After the end of the reaction, the surface of the substrate was examined with a SEM and it was confirmed that an aligned carbon nanotube film had been formed in a thickness of about 5 μm on top of the substrate. The individual carbon nanotubes had outside diameters of 8-20 nm.

EXAMPLE 4

A square silica-alumina sheet that consisted of 25% silica and 75% alumina and which measured 2 mm thick and 30 mm on each side was chosen as a substrate. This substrate was dipped in Silica Sol SNOWTEX PS-SO of Nissan Chemical Industries, Ltd. as diluted 2-fold with ion-exchanged water. After 10 minutes' dipping, the substrate was recovered from the solution, dried in the air and burned at 700° C. for 5 hours. Measurement by the BET method showed that the alumina burned by the above procedure had an average pore size of 13.2 nm.

Except for the use of this substrate, preparation of a catalyst fluid, dipping of the substrate in the catalyst fluid and a reaction for producing a carbon nanotube aligned film were performed as in Example 1. After the end of the reaction, the surface of the substrate was examined with a SEM and it was confirmed that an aligned carbon nanotube film had been formed in a thickness of about 15 μm on top of the substrate. The individual carbon nanotubes had outside diameters of 15-25 nm.

EXAMPLE 5

A square silica-alumina sheet that consisted of 25% silica and 75% alumina and which measured 2 mm thick and 30 mm on each side was chosen as a substrate. This substrate was dipped in a 1:9 mixture of Silica Sol SNOWTEX O and Alumina Sol 200, both being the products of Nissan Chemical Industries, Ltd., as diluted 2-fold with ion-exchanged water. After 10 minutes' dipping, the substrate was recovered from the solution, dried in the air and burned at 700° C. for 5 hours. Measurement by the BET method showed that the alumina burned by the above procedure had an average pore size of 5.3 nm.

Except for the use of this substrate, preparation of a catalyst fluid, dipping of the substrate in the catalyst fluid and a reaction for producing a carbon nanotube aligned film were performed as in Example 1. After the end of the reaction, the surface of the substrate was examined with a SEM and it was confirmed that an aligned carbon nanotube film had been formed in a thickness of about 10 μm on top of the substrate. The individual carbon nanotubes had outside diameters of 4-9 nm.

EXAMPLE 6

Carbon nanotubes were prepared as in Example 1, except that an aqueous solution of iron(III) nitrate with a concentration of 0.2 mol/L was used as a catalyst fluid. After the end of the reaction, the surface of the substrate was examined with a SEM and it was confirmed that an aligned carbon nanotube film had been formed in a thickness of about 10 μm on top of the substrate. The individual carbon nanotubes had outside diameters of 8-20 nm.

EXAMPLE 7

Carbon nanotubes were prepared as in Example 3, except that an aqueous solution of iron(III) nitrate with a concentration of 0.2 mol/L was used as a catalyst fluid. After the end of the reaction, the surface of the substrate was examined with a SEM and it was confirmed that an aligned carbon nanotube film had been formed in a thickness of about 5 μm on top of the substrate. The individual carbon nanotubes had outside diameters of 30-50 nm.

EXAMPLE 8

Tetra-n-propoxyammonium bromide (3.3 g) was dissolved in ethanol (46 g). Pure water (1.0 g) and hydrochloric acid (0.03 ml) were added to the solution. A square silica-alumina sheet that consisted of 25% silica and 75% alumina and which measured 2 mm thick and 30 mm on each side was dipped in the solution. After 10 minutes' dipping, the silica-alumina sheet was recovered from the solution, dried in the air and burned at 500° C. for 2 hours. Measurement by the BET method showed that the alumina burned by the above procedure had an average pore size of 1.4 nm.

The thus prepared silica substrate was dipped in a 4.0 wt % aqueous solution of cobalt acetate for 10 minutes. The substrate was recovered from the aqueous solution, air dried for 1 hour and further dried at 80° C. for 15 hours.

After cooling, the substrate was placed in a quartz glass tubular oven having a diameter of 35 mm. With argon being supplied at a rate of 360 cm$^3$/min in a horizontal direction under atmospheric pressure (0.1 Mpa), the temperature in the tubular oven was raised to 700° C. Then, with the temperature held at 700° C., argon (360 cm$^3$/min) was mixed with propylene (180 cm$^3$/min) and supplied into the tubular oven. After the mixture of propylene and argon gases was flowed for 20 minutes, the supply was changed to pure argon and the heating in the tubular oven was stopped, with the substrate being left to cool to room temperature.

After the end of the reaction, the surface of the substrate was examined with a SEM and it was confirmed that an aligned carbon nanotube film had been formed in a thickness of about 10 μm on top of the substrate. Examination with a TEM showed that the carbon nanotubes in the aligned film stacked in 2-5 layers with outside diameters of 3-10 nm.

EXAMPLE 9

A catalyst loading on substrate was prepared as in Example 8.

After cooling, the substrate was placed in a quartz glass tubular oven having a diameter of 35 mm. With argon being supplied at a rate of 360 cm$^3$/min in a horizontal direction under atmospheric pressure (0.1 Mpa), the temperature in the tubular oven was raised to 800° C. Then, with the temperature held at 800° C., argon (360 cm$^3$/min) was mixed with ethanol (350 cm$^3$/min) and supplied into the tubular oven. After the mixture of ethanol and argon gases was flowed for 10 minutes, the supply was changed to pure argon and the heating in the tubular oven was stopped, with the substrate being left to cool to room temperature.

After the end of the reaction, the surface of the substrate was examined with a SEM and it was confirmed that an aligned carbon nanotube film had been formed in a thickness of about 10 μm on top of the substrate. Examination with a TEM showed that the carbon nanotubes in the aligned film were both single-walled and up to five-walled, with outside diameters of 1-8 nm.

EXAMPLE 10

A catalyst loading on substrate was prepared as in Example 8.

After cooling, the substrate was placed in a quartz glass tubular oven having a diameter of 35 mm. With argon being supplied at a rate of 360 cm$^3$/min in a horizontal direction under atmospheric pressure (0.1 Mpa), the temperature in the tubular oven was raised to 900° C. Then, with the temperature held at 900° C., argon (360 cm$^3$/min) was mixed with ethanol (340 cm$^3$/min) and supplied into the tubular oven. After the mixture of ethanol and argon gases was flowed for 3 minutes, the supply was changed to pure argon and the heating in the tubular oven was stopped, with the substrate being left to cool to room temperature.

Figure 4:
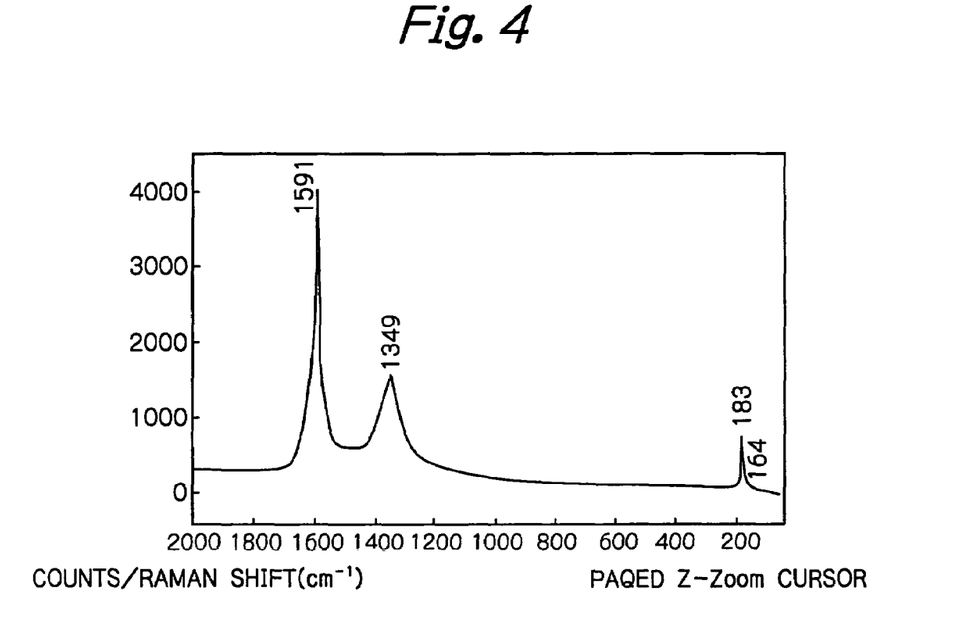
FIG. 4 is a Raman Spectrum of carbon nanotubes.

After the end of the reaction, the surface of the substrate was examined with a SEM and it was confirmed that an aligned carbon nanotube film had been formed in a thickness of about 1 μm on top of the substrate. Then the aligned carbon nanotube film was examined with a Raman spectroscope. As a result, a strong peak was observed at 183 cm$^{-1}$ as illustrated in FIG. 4 for the Raman Spectrum of the carbon nanotubes film. This means the existence of a lot of single-walled carbon nanotubes.

COMPARATIVE EXAMPLE 1

A square silica-alumina sheet of the same type as used in Example 1 was immediately used as a substrate without being coated with a sol-gel method alumina. Measurement by the BET method showed that pores smaller than 50 nm were practically absent from the substrate. An attempt was made to prepare carbon nanotubes on the substrate by repeating the procedure of Example 1 but no carbon nanotube aligned film was produced.

COMPARATIVE EXAMPLE 2

A square silica-alumina sheet that consisted of 25% silica and 75% alumina and which measured 2 mm thick and 30 mm on each side was chosen as a substrate. This substrate was dipped in Alumina Sol 200 of Nissan Chemical Industries, Ltd. as diluted 4-fold with ion-exchanged water. After 10 minutes' dipping, the substrate was recovered from the solution, dried in the air and burned at 1000° C. for 5 hours. Measurement by the BET method showed that the alumina burned by the above procedure was substantially free of pores smaller than 50 nm. An attempt was made to prepare carbon nanotubes on the substrate by repeating the procedure of Example 1 but no carbon nanotube aligned film was produced.

According to the invention, aligned carbon nanotubes can be produced on a substrate by very simple steps of dipping and burning without requiring any of the cumbersome processes involved in the prior art.

According to the invention, it is also possible to produce an aligned carbon nanotube film having a larger area than the conventional small-area products. Further, the outside diameter of carbon nanotubes can be controlled to produce an aligned film comprising carbon nanotubes having an outside diameter of no more than 10 μm and a length of at least 10 μm.

An aligned film comprising carbon nanotubes having an outside diameter of no more than 10 nm exhibits high performance in electron emission characteristics, rigidity and other properties. An aligned film comprising carbon nanotubes longer than 10 μm can be handled with ease.

What is claimed is:

1. A process for preparing aligned nanotubes on a porous carrier, the process comprising:
   preparing a porous carrier having fine pores of 0.1 to 50 nm by a sol-gel method;
   loading a catalyst onto the porous carrier by contacting the porous carrier with a base in an aqueous solution of a metal salt and drying and burning the solution within the pores of the porous carrier; and
   depositing a carbon compound on the porous carrier to form a nanotube film aligned perpendicular to the porous carrier.

2. The process of claim 1, wherein the porous carrier is a sheet, tubular shape, spherical shape or membrane.

3. The process of claim 1, wherein the porous carrier is a membrane or on a surface of a support.

4. The process of claim 1, wherein the porous carrier is made of a ceramic material.

5. The process of claim 4, wherein the ceramic material is alumina, silica or silica-alumina.

6. The process of claim 1, wherein the starting sol of the sol-gel is a dispersion of alumina particles, aluminum hydroxide particles, silica particles or mixtures thereof.

7. The process for preparing aligned nanotubes on a porous carrier of claim 3, wherein
   the support is a heat stable material selected from the group consisting of a metal, a metal oxide, a ceramic material, glass, silicon and silicon oxide.

8. The process of claim 1, wherein the catalyst is selected from the group consisting of Fe, Co, Ni, Mo and compounds thereof.

9. The process of claim 1, wherein the catalyst comprises particles having a particle size of 0.1-50 nm.

10. The process of claim 6, wherein the alumina particles, the aluminum hydroxide particles and the silica particles are not larger than 100 nm and stand either on their own or are connected in a chain.

11. The process of claim 1, wherein the starting sol of the sol-gel is an aluminum alkoxide, an alkoxysilane, a mixture thereof or a solution of an aluminum alkoxide, an alkoxysilane or a mixture thereof.

12. The process of claim 11, wherein a flammable or a thermally decomposable organic compound is added as a microporous template.

13. A process for preparing aligned nanotubes on a porous carrier, the process comprising:
   preparing a porous carrier having fine pores of 0.1 to 50 nm by a sol-gel method, the sol-gel comprising an aluminum alkoxide, an alkoxysilane, a mixture thereof or a solution of an aluminum alkoxide, an alkoxysilane or a mixture thereof, and a thermally decomposable quaternary ammonium salt as a microporous template;
   loading a catalyst onto the porous carrier; and
   depositing a carbon compound on the porous carrier to form a nanotube film having nanotubes aligned perpendicular to the porous carrier.

14. The process of claim 1, wherein the sol-gel is heated at a temperature in the range of 300-900° C. to form the porous carrier.

15. The process of claim 1, wherein the catalyst is loaded on the porous carrier by impregnation or dipping.

16. The process of claim 1, wherein ammonia or a water-soluble amine is used as the base.

17. The process of claim 1, wherein aqueous ammonia is used as the base.

18. The process of claim 1, wherein the metal salt is a salt of Fe, Co, Ni or Mo.

19. The process of claim 1, wherein the metal salt is selected from the group consisting of a nitrate, a sulfate, a carbonate, an acetate, a naphthenate, a fluoride, a chloride, a bromide or an iodide.

20. The process of claim 1, wherein the carbon compound is at least one member selected from the group consisting of saturated hydrocarbon compounds, unsaturated hydrocarbon compounds, aromatic hydrocarbon compounds and oxygen-containing hydrocarbon compounds.

21. The process of claim 1, further comprising heating the carbon compound at a temperature of 400° to 1100° C. to decompose the carbon compound and form the aligned nanotubes.

* * * * *